June 4, 1968     O. E. HOWLAND     3,386,683
POWER RETRACTION INERTIA REEL
Filed Feb. 10, 1966     2 Sheets-Sheet 1
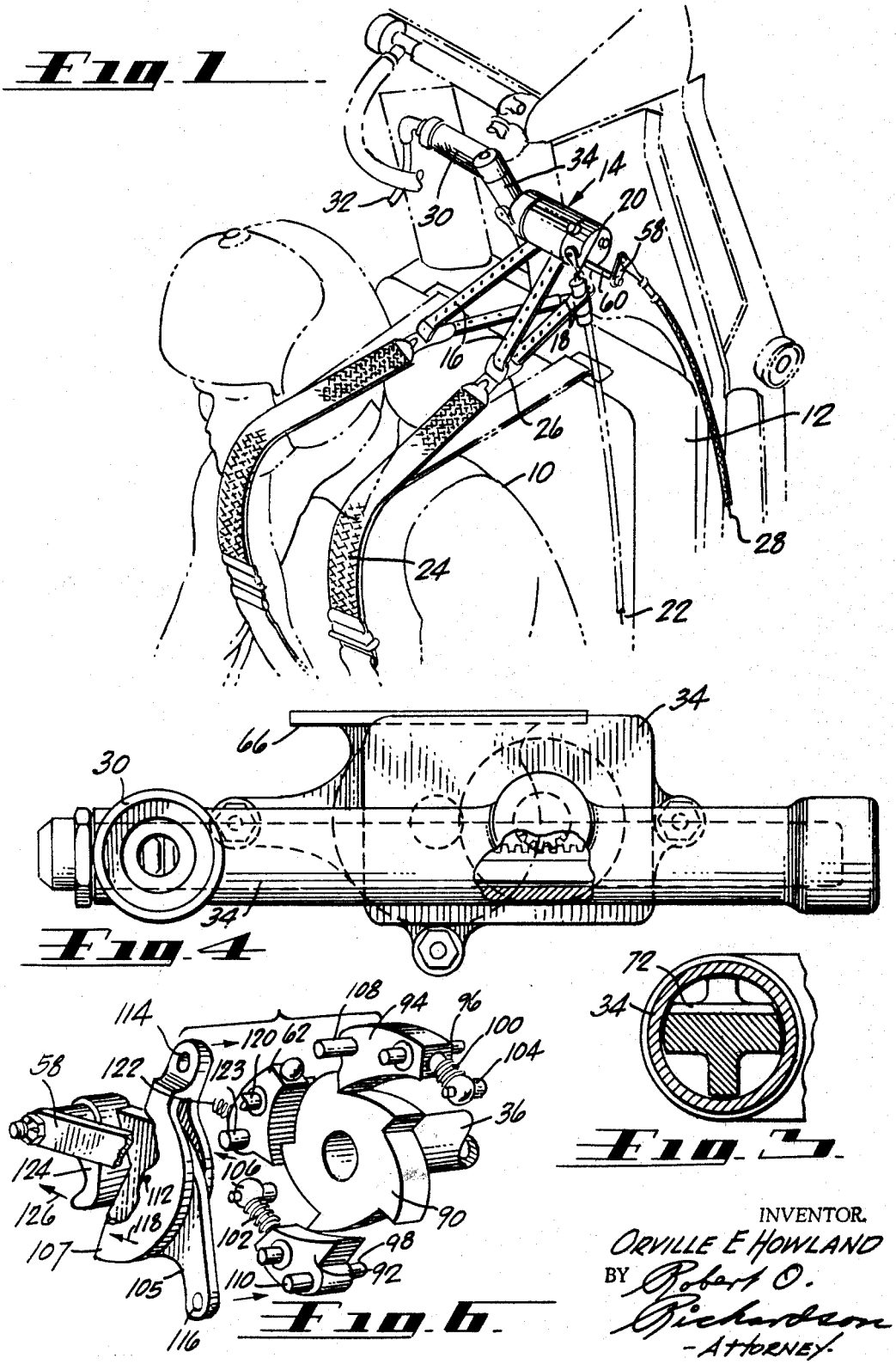
INVENTOR.
ORVILLE E. HOWLAND
BY Robert O. Richardson
—ATTORNEY

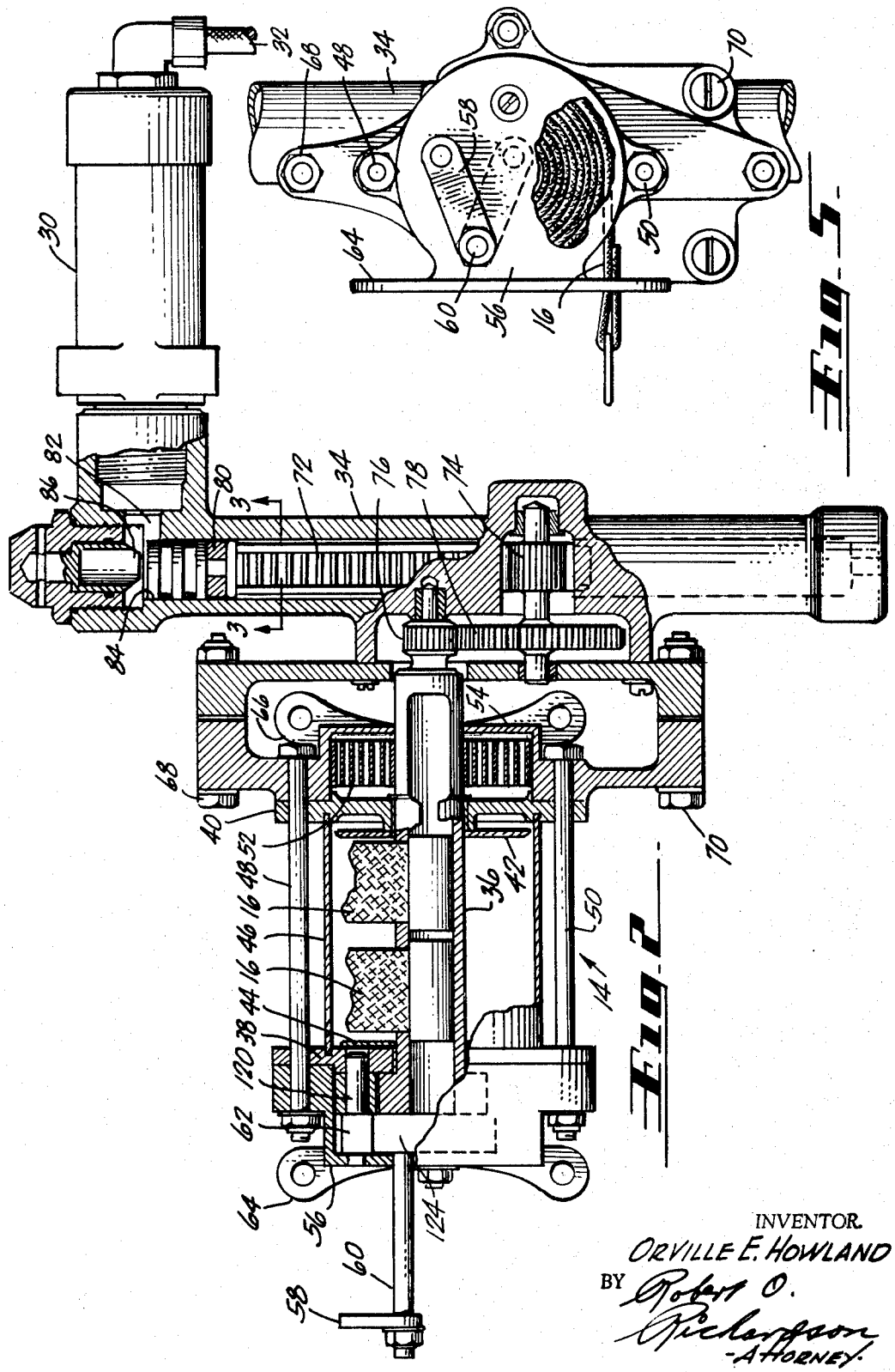

United States Patent Office 3,386,683
Patented June 4, 1968

3,386,683
POWER RETRACTION INERTIA REEL
Orville E. Howland, Costa Mesa, Calif., assignor, by mesne assignments, to McDonnell Douglas Corporation, Santa Monica, Calif., a corporation of Maryland
Filed Feb. 10, 1966, Ser. No. 526,462
6 Claims. (Cl. 242—107.4)

ABSTRACT OF THE DISCLOSURE

A power actuated inertia reel is provided for restraining and positioning an occupant of a seat during emergency escape. A shoulder harness has a mechanism to permit unreeling of the straps so the occupant has freedom of activity in performing normal cockpit functions. Sudden deceleration of the vehicle, as in a crash, actuates a locking mechanism to prevent unwinding of the straps. A power take-up mechanism is actuated by the seat ejection structure during an emergency escape to wind up the harness straps and thus position the occupant for ejection.

Background of the invention

Pilots, crew members and passengers of high-speed vehicles, whether they travel on water, land or in the air, fasten themselves in their seats by means of seat belts and shoulder harnesses. These belts and harnesses have inertia devices which will unreel to permit the occupant to lean forward for the purpose of reading instruments, actuating controls and performing other limited activities. These inertia reels are adapted to restrain further unreeling movement during a sudden deceleration of the vehicle or a sudden forward movement by the occupant. An inertia reel, which performs this function, forms a part of the present invention. However, during an emergency escape by modern ejection seats, this type of restraint is inadequate since it does not provide assurance of correct positioning of the occupant's body prior to the seat's ejection.

In order to prevent back injuries that can be caused by ejection while the occupant is improperly positioned, there is a need to provide for positive retraction of the occupant's torso to eliminate this source of injury. Because of the very short time available for pre-ejection body positioning, particularly in ground level escapes, there is a need for automatic power retraction of the shoulder harness prior to the ejection of the seat and occupant. The desirability of utilizing power retraction of shoulder harnesses has gained additional importance by the employment of rocket catapults in present day ejection seats. The rocket thrust of these catapults requires that the center of gravity of the ejected mass including the seat and occupant be closely controlled in order to maintain proper thrust alignment. Positive positioning of the seated occupant becomes a definite requirement in attaining maximum rocket efficiency and safe ejection trajectories.

Summary of the invention

It is therefore an object of this invention to provide for a novel power retraction inertia reel.

Another object is to provide an inertia reel for the shoulder harness of an occupant of a moving vehicle which retracts and elongates as the occupant undergoes limited movement in the vehicle and which fully retracts the shoulder straps when so desired.

Another object is the provision of a power retraction reel for retracting the shoulder straps of an occupant of a vehicle to thereby properly position the body of an occupant and thus prevent back injuries due to ejection from said vehicle.

Another object is the provision of a power retraction inertia reel having a self-contained unit designed to provide a positive powered haul-back of dual shouldered harness straps in combination with an inertia reel.

Other objects will become more apparent as a description of the invention proceeds, having reference to the drawings, wherein:

Brief description of drawings

FIGURE 1 is a perspective view showing the powered inertia reel and shoulder straps relative to an occupant and escape seat, FIGURE 2 is a partial sectional view showing the inertia reel and power mechanism, FIGURE 3 is a sectional view taken along the lines 3—3 of FIGURE 2, FIGURE 4 is an end view with portions removed showing the shoulder harness wind-up reel, FIGURE 5 is the other end view of the inertia reel, and FIGURE 6 is an exploded view of the ratchet wheel and inertia operated portions of the reel.

Description of present embodiment

Referring now to FIGURE 1, there is shown, in phantom lines, an occupant 10 of a seat 12 of a vehicle, not shown. To the back of seat 12 is affixed a take-up reel 14. By means of an internal retracting mechanism, hereinafter to be described, a short length of nylon webbing 16 or other flexible tension-bearing members such as cables, for example, are normally retracted by the take-up reel 14. Ends 18 of the webbing 16 are releasably retained by means of pin 20 passing through apertures therein. Pin 20 may be withdrawn by means of cable 22 to free the occupant 10 from the harness in the event of emergency. Harness straps 24 pass over the shoulders of the occupant 10 and may be fastened to the occupant's clothing or to some fixed position on the seat 12. Harness straps 24 terminate at their upper ends in shoulder harness roller fittings 26, through which pass the nylon webbing 16. The retracting force of the take-up reel 14 resiliently retracts the webbing 16 to maintain harness straps 24 snugly against the occupant's body. The strength of the resilient means within reel 14 is readily overcome by occupant movement when reel 14 is in unlocked position, and normal body motion of occupant 10 will withdraw webbing 16 from reel 14 as needed. The rollers in roller fittings 26 reduce the friction as the nylon webbing 16 is withdrawn and retracted into reel 14. Conveniently positioned for operation by the occupant is a Bowden-type cable 28 which is connected to the take-up reel 14 for locking the reel when a sudden deceleration is expected, such as in the case of arrested carrier deck landings of aircraft, for example.

In the event of emergency, the occupant 10 and seat 12 are ejected from the vehicle by means of a rocket catapult or other advanced escape mechanism and in such cases it is essential that the occupant 10 be positioned snugly against the seat 12 in order to prevent injury. To accomplish this, reel 14 is made to retract and wind the webbing 16 into the reel 14. This power retraction is provided by a ballistically fired gas generator contained within power unit housing 30. This generator is actuated through a conductor 32 and actuates a piston, rack and pinion mechanism in link housing 34, which in turn causes the nylon webbing 16 to wind up on the take-up reel 14.

Reference is now made to FIGURES 2 through 5, where parts are broken away to show the inner structure and to more clearly illustrate the operation thereof.

In FIGURE 2 the inner ends of webbing 16 terminate on shaft 36 which is journaled for rotation on dividing discs 38–40. Web edge confining discs 42–44 confine the web 16 to its position on shaft 36 as it is wound thereon and prevents accidental jamming or tangling of the web with the dividing discs 38–40. Sleeve 46 spaces apart dividing discs 38 and 40 which are secured thereagainst by tie-bolts 48–50. Sleeve 46 has an appropriate slit therein to permit movement of the webbing 16 into and out of the sleeve as shaft 36 is rotated. Torsion spring 52 mounted within end plate 54 urges the rotation of shaft 36 in a direction to wind webbing 16 thereon. Within end plate 56 is an inertia actuated locking mechanism which, when lever 58 on shaft 60 is in one position, locks shaft 36 in a non-extendable position and, when lever 58 is in another position, operates to permit the withdrawal of webbing 16 from the housing of the reel 14 and thus give the occupant freedom of movement. This inertia actuated structure, shown in FIGURE 2 only as a pawl 62 pivotally mounted on dividing disc 38, also locks shaft 36 in non-extendable position upon a sudden deceleration of the craft in which this reel is mounted. Further details of the inertia actuation structure and its operation will be described later herein, with reference to FIGURE 6. Mounting pads 64–66 are used for mounting the reel on the seat structure behind the occupant to be retained by webbing strips 16.

The automatic power retraction mechanism is shown in the several views as being within the gear box assembly housing 34 which is fastened to end plate 54, as shown by bolts 68–70. A rack 72 within a longitudinal passageway 84 in housing 34 engages and actuates pinion 74 which in turn causes rotation of shaft 36 through reduction gears 76 and 78. At one end of rack 72 is located piston head 80 which remains stationary until power actuated.

An external source of pressure communicates with and actuates piston head 80 through port 82, it being understood that piston head 80 and rack 72 may be actuated by a remote gas pressure source of any type. Preferably, however, power unit housing 30 is connected for communication to port 82 and contains a ballistically fired gas generator for this purpose. This generator, in turn, is actuated through conductor 32 by the initiation of ejection controls or some initiator as part of the pre-ejection sequence. Plug 86 has an inwardly extending projection to insure position of piston head 80 below port 82.

Since the automatic power retraction structure, in the preferred embodiment, works in conjunction with the inertia reel structure, this structure should now be described. Having reference to FIGURE 6, there is shown the main shaft 36 upon which a webbing 16 winds and unwinds. Immovably attached coaxially thereto is a toothed ratchet wheel 90. Above and below the axis of rotation of the ratchet wheel 90 are a pair of pawls 92–94 having pivot pins 96–98 for pivotal movement on dividing disc 38, as shown in FIGURE 2. Coil springs 100–102 are interposed between the pawls and fixed posts 104–106 on the dividing disc 38 in FIGURE 2 and at all times urge the associated pawls into engagement with the ratchet wheel 90. To each pawl 92–94, respectively, are connected levers 105–107 pivotally mounted thereon by means of pins 108–110. Levers 105–107 in turn are pivoted to each other at pivot point 112, thereby forming a toggle joint. The levers and pivotal arrangement is such that when the toggle joint is at dead center, that is, the apertures 114 and 116 of levers 105–107 are spaced apart a maximum allowable distance, by means of the pivot pins 108–110 within these apertures, the pawls 92–94 are urged outwardly out of contact with the ratchet wheel 90. This then permits the main shaft 36 to rotate in either direction. With the pawls in this direction, the coil springs 100 and 102 are moved over their center positions and thus tend to urge the pawls to remain in this position. The mass of the levers 105 and 107 is of an adequate amount that upon a rapid deceleration from a velocity in a direction of arrow 118 which is the normal vehicle motion direction, the toggle joint moves forwardly across dead center in the direction of the arrow 118. In moving to this position, the pawls 92–94 engage the ratchet wheel 90 to lock it, thereby preventing further payout of the webbing 16. In this manner the vehicle occupant is restrained by the body harness from being thrown forward. The third pawl 62 is also pivoted to the dividing disc 38 in FIGURE 2 by means of pivot pin 120 and is urged to ratchet wheel engagement by compression spring 122. This spring pressure against pawl 62 is overcome by the action of a manually operable lever 58 upon manipulation of Bowden-type cable 28 shown in FIGURE 1. Lever 58 turns finger 124 which, when turned in the direction of arrow 126, contacts cam 123 which protrudes laterally from pawl 62. This frees the ratchet wheel 90 from contact by pawl 62 which otherwise would lock the wheel from rotating in a web extending direction. When the finger 124 is turned in a direction opposite that of arrow 126 so as to be removed from contact with pin 128, compression spring 122 causes the cam face of pawl 62 to engage the ratchet wheel 90. Additionally, finger 124 in this position retains levers 105–107 in the center position to thus place pawls 92–94 in the cocked position. In this manner, at all times, pawl 62 is in the locked position or the pawls 92 and 94 are in the cocked position for actuation upon sudden deceleration, or they are in the reel locking position. This mechanism shown in FIGURE 6 is substantially shown and described in Patent Number 2,923,492 for an inertia reel which issued Feb. 2, 1962 to H. L. Walpole et al., and having a common assignee.

While the power retraction inertial reel comprising the present invention, in its preferred embodiment, includes an integrally mounted ballistically fired gas generator and an inertia actuated locking mechanism as just described, it is to be understood that there are other modifications and variations in structure that will at once become apparent to those skilled in the art, having first been taught the concepts of the present invention. It is therefore to be understood that these deviations from the preferred embodiment also are to be considered as part of the invention as claimed in the appended claims.

What is claimed is:

1. A power retraction inertia reel including a shaft having straps thereon, said shaft being rotatably mounted,
    means urging rotation of said shaft to wind up said straps thereon,
    a link housing having a rack and pinion mechanism therein,
    means connecting said pinion to said shaft for rotation thereof upon longitudinal movement of said rack,
    a piston head positioned within said link housing,
    a source of pressure,
    a port communicating with said source of pressure and said piston head whereby said source of pressure moves said piston head against said rack to cause longitudinal movement thereof.

2. A power retraction inertia reel as in claim 1 wherein said shaft has a ratchet wheel thereon, a locking pawl movable into contact with said ratchet wheel to prevent rotation thereof in a direction to unwind webbing thereon, and
    an inertia means for locking said pawl against said ratchet wheel.

3. A power retraction inertia reel as in claim 2 wherein said inertia means actuates upon sudden deceleration of said inertia reel.

4. A power retraction inertia reel as in claim 2 wherein said inertia means consists of:
    a pair of levers pivotally connected together, said pawl connected to one of said levers, and a second pawl connected to the other lever, said pawls being diametrically spaced from said ratchet wheel,
    said levers in extended position holding said pawls in spaced relationship from said ratchet wheel, and
    wherein sudden deceleration of said reel causes a scissors-like action to said levers to thereby move said pawls into engagement with said ratchet wheel.

5. A power retraction inertia reel comprising:
a reel housing,
a shaft rotatably mounted within said housing and having webbing attached thereto to be wound thereon,
said shaft having a gear at one end thereof,
power retraction means engageable with said gear for rotating said shaft in a direction to wind said webbing upon said shaft,
said power retraction means including a link housing having a rack and pinion mechanism therein wherein longitudinal movement of said rack causes rotation of said pinion,
connecting means between said pinion and said shaft gear to cause rotation thereof,
means for effecting longitudinal movement of said rack including a piston head at one end thereof and gas cartridge means and actuating means therefor for exerting pressure on said piston head,
spring means urging rotation of said reel to wind up said webbing,
said shaft having a ratchet wheel thereon,
locking pawls movable into position to engage said ratchet wheel for locking said shaft against rotation in a direction for unwinding said webbing from said shaft, and
inertia means for moving said pawls into said position.

6. A power retraction inertia reel as in claim 5 wherein said inertia mechanism actuates upon sudden deceleration of forward movement of said reel.

References Cited

UNITED STATES PATENTS

| | | | |
|---|---|---|---|
| 2,923,492 | 2/1960 | Walpole et al. | 242—107.4 |
| 3,077,324 | 2/1963 | Strickland | 244—122 |
| 3,105,662 | 10/1963 | Wrighton | 242—107.4 X |
| 3,178,136 | 4/1965 | Bayer | 242—107.4 X |
| 3,189,296 | 6/1965 | Wrighton et al. | 242—107.4 |
| 3,215,376 | 11/1965 | Martin | 244—122 |

WILLIAM S. BURDEN, *Primary Examiner.*